Patented May 2, 1950

2,506,050

UNITED STATES PATENT OFFICE 2,506,050

SYNTHESIS OF CYANOTRICARBOXYLATE COMPOUNDS

Donald T. Warner and Owen A. Moe, Minneapolis, Minn., assignors to General Mills, Inc., a corporation of Delaware No Drawing. Application October 4, 1948, Serial No. 52,794

5 Claims. (Cl. 260—465.4)

The present invention relates to the synthesis of cyanotricarboxylate compounds which have novel properties and which are useful as intermediates for further syntheses, particularly for the production of substituted pimelic acids.

It is, therefore, an object of the present invention to provide novel cyanotricarboxylate compounds having novel properties which are useful in further syntheses particularly for the synthesis of substituted pimelic acids.

It is a further object of the present invention to provide a process for preparing such compounds.

The cyanotricarboxylate compounds of the present invention have the following formula:

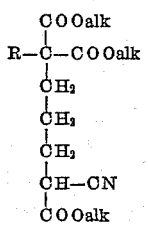

where alk represents an alkyl group, and R is an alkyl group containing from two to twenty carbon atoms.

These compounds can be readily hydrolyzed to tetracarboxylic acids, which in turn can be decarboxylated to yield substituted pimelic acids.

These cyanotricarboxylate compounds may be prepared by the condensation-reduction reaction of cyanoacetic ester and gamma,gamma-dicarbalkoxy-gamma-alkyl butyraldehyde.

The gamma,gamma-dicarbalkoxy-gamma-alkyl butyraldehyde employed in this condensation may be prepared as disclosed in our copending application Serial No. 714,645, filed December 6, 1946, entitled Aldehydes, now abandoned. According to that application, these aldehydes may be prepared by the condensation of an alkyl-substituted malonic ester with acrolein which results in the direct production of the desired aldehyde. The details of this condensation will be more fully apparent from the examples herein.

The condensation reduction of the aldehyde to the cyanotricarboxylate compounds of the present invention and the subsequent conversion of the cyanotricarboxylate compounds to substituted pimelic acid are illustrated by the following reaction which demonstrates the reaction of ethyl cyanoacetate with gamma,gamma-dicarbethoxy-gamma-ethyl butyraldehyde for the ultimate production of alpha-ethyl pimelic acid:

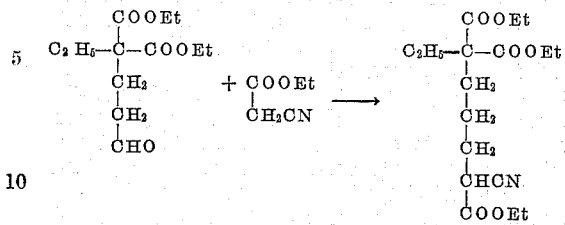

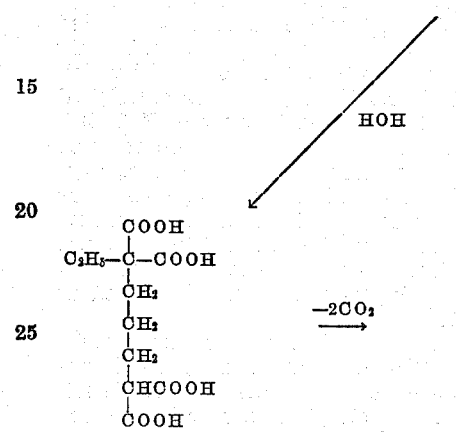

The condensation reduction may be carried out in the presence of a suitable solvent such as ethanol, dioxane, and the like, in the presence of a conventional hydrogenation catalyst, and under hydrogen pressure. When the reduction is complete, the reaction mixture may be filtered and the filtrate concentrated in vacuo. Thereafter the residual oil may be dissolved in benzene and washed with water. The benzene may then be removed by distillation, after which the residue may be purified by distillation under reduced pressure. The cyanotricarboxylate compound thus obtained may be hydrolyzed in alkaline media to the corresponding tetracarboxylic acid, which may then be isolated. These tetracarboxylic acids may then be decarboxylated by heating them above the melting point. The cyanotricarboxylate compounds may be hydrolyzed directly to the substituted pimelic acids in acidic media.

The following examples will serve to illustrate the invention.

Example 1

An alcoholic solution containing 200 parts of absolute ethyl alcohol, 0.04 part of sodium, and 75.1 parts of ethyl ethylmalonate was cooled to —1° C. Acrolein (23.5 parts) was added over a 45-minute period at such a rate that the reaction temperature was maintained between 0° C.–4° C. The final reaction mixture was stirred for an additional hour in an ice bath and then placed in the refrigerator for a period of 14 hours. After standing for 14 hours, the catalyst was neutralized by the addition of one part of glacial acetic acid. The alcohol was removed by distillation under diminished pressure. The residual oil was mixed with 400 parts of benzene and the benzene solution was extracted with water. The benzene solution was then dried over anhydrous sodium sulfate and finally removed by distillation under diminished pressure. The residual oil which was subjected to fractional distillation under diminished pressure weighed 88.6 parts. Distillation yielded approximately 67 parts of distillate which was collected over the range of 60–100° C. at 0.2 mm. The very viscous residue weighed 19 parts. The distillate was subjected to another distillation under diminished pressure and five fractions were obtained. The first fraction which was collected at 47–54° C. at 0.1 mm. weighed 7 parts and proved to be substantially ethyl ethylmalonate. The second fraction which was collected at 54–70° C. at 0.08 mm. weighing approximately 6 parts was presumably a mixture of the unreacted malonic ester and the desired aldehydo compound. The third fraction which was collected at 70–75° C. at 0.07 mm. weighed 15 parts and had a $n_D^{25}$ 1.4372. The fourth fraction which was collected at 75–75.5° C. at 0.07 mm. weighed approximately 19 parts and had a $n_D^{25}$ 1.4386. Sample 5 which was collected at 75.5–77° C. at 0.07 mm. weighed approximately 16 parts and had a $n_D^{25}$ 1.4394. The last three fractions, 3, 4, and 5, proved to be substantially pure gamma,gamma-dicarbethoxy-caproaldehyde. The aldehydo compound was characterized as the 2,4-dinitrophenylhydrazone which was prepared in the conventional manner. The purified dinitrophenylhydrazone of gamma,-gamma - dicarbethoxy - caproaldehyde melted at 100.5–101.5° C.

24.4 g. of gamma-ethyl-gamma,gamma-dicarbethoxy butyraldehyde (gamma,gamma - dicarbethoxy caproaldehyde) were dissolved in 50 ml. of absolute ethanol and 12.5 g. of ethyl cyanoacetate and 1.2 g. of glacial acetic acid were added. The resulting reaction mixture was cooled to 8° C. when 0.4 g. of piperidine was added with shaking over a 5-minute period. Then 1.2 g. of 5% palladium on charcoal was added and the hydrogenation was started at 40–50 pounds hydrogen pressure. The reduction was substantially complete after a 3-hour period. The catalyst was removed by filtration and the filtrate was concentrated in vacuo. The residue was dissolved in benzene and treated as previously described. Distillation of the reaction product under diminished pressure yielded three fractions. The first fraction was discarded and the second (main) fraction was collected at 156–163° C. at 0.12 mm. $n_D^{25}$ 1.4489. The third fraction was collected at 163–177° C. at 0.15–0.25 mm. $n_D^{25}$ 1.4520. The last two fractions were combined and subjected to redistillation under diminished pressure and the desired fraction was collected at 145–147° C. at 0.07 mm. $n_D^{25}$ 1.4482.

Five and four-tenths gram of the redistilled product were mixed with 25 ml. of sodium hydroxide solution (4.1 g. sodium hydroxide). The evolution of ammonia had ceased after a refluxing period of 44 hours. The reaction mixture was cooled, filtered and acidified with hydrochloric acid. The precipitated inorganic salts were removed by filtration. The filtrate was concentrated in vacuo to yield a residual oil which solidified. The crude product thus obtained melted at 168–173° C. with decomposition. When this tetracarboxylic acid was recrystallized from benzene in ether mixture it melted at 170–171° C. with decomposition (neutral equivalent calculated at 69.0, found 70.5). One and one-tenth gram of the above tetracarboxylic acid was decarboxylated at 190° C. When the evolution of carbon dioxide had ceased the resulting alpha-ethyl pimelic acid weighed 0.74 g. The alpha-ethyl pimelic acid was characterized as the dianilide which melted at 160–161° C. after purification.

Example 2

160 parts of absolute ethanol were reacted with 0.1 part of metallic sodium. When the sodium had reacted, 114.1 parts of diethyl decylmalonate were added and the solution was cooled to 0° C. To the cold solution, 23.5 parts of acrolein were added at such a rate that the temperature remained between 0° and +5° C. The reaction mixture was cooled at +3° C. for an additional 60 hours. The catalyst was then neutralized by the addition of one part of glacial acetic acid, and the reaction mixture was concentrated in vacuo on a water bath. The residual oil was dissolved in benzene, and the solution extracted with water, after which the benzene solution was dried over anhydrous sodium sulfate. After filtering the sodium sulfate, the benzene was removed by evaporation in vacuo. The residual oil was subjected to distillation at approximately 0.5 mm. to remove the excess diethyl decylmalonate. The crude aldehyde compound was obtained as a residue weighing 99.0 parts, $n_D^{25}$ 1.4542.

51.9 parts of crude aldehydo compound (gamma-decyl-gamma, gamma-dicarbethoxy butyraldehyde) were dissolved in 40 parts of 95% ethanol. 1.5 parts of glacial acetic acid and 20.3 parts of ethyl cyanoacetate were added. The solution was cooled to 8° C. and 0.5 parts of piperidine were added in small portions. When the addition was complete, 1.4 parts of 5% palladium on charcoal were introduced; and the mixture was hydrogenated at an initial pressure of 37 pounds of hydrogen. Approximately 75% of the theoretical hydrogen was absorbed in a 20-hour period. The catalyst was removed by filtration and the filtrate was concentrated to a syrup. This syrup was dissolved in ether, and the solution was extracted with a 5% sodium chloride solution. The ether layer was dried over anhydrous sodium sulfate, filtered, and the ether was removed by evaporation on a steam bath. The residue was subjected to distillation at 0.7 mm. The main fraction boiled at 205–218°/0.7 mm., $n_D^{25}$ 1.4534. Redistillation yielded purified ethyl-alpha-cyano-epsilon, epsilon-dicarbethoxy hexadecanoate, B. P.=184–187° C./0.08 mm., $n_D^{25}$ 1.4531.

Example 3

The 1,4 addition of ethyl hexylmalonate to acrolein was carried out as follows:

Ethyl hexylmalonate (9.65 g.) was added to 30 ml. of absolute ethanol containing sodium ethoxide (prepared from 20 mg. of metallic sodium). The resulting reaction mixture was cooled to 0° C. and acrolein (2.24 g.) was added dropwise. The reaction mixture was cooled for 16 hours. The catalyst was neutralized with glacial acetic acid and concentration of the resulting solution in vacuo yielded a residual oil. A portion of this residual oil, when treated with 2,4-dinitrophenylhydrazine, yielded a 2,4-dinitrophenylhydrazone melting at 86-87° C. This was the 2,4-dinitrophenylhydrazone of gamma,gamma-dicarbethoxy-gamma-hexylbutyraldehyde.

Anal. Calcd. for $C_{22}H_{32}O_8N_4$: C, 54.96; H, 6.70. Found: C, 54.45; H, 6.70.

0.1 mole of the crude gamma,gamma-dicarbethoxy-gamma-hexylbutyraldehyde was dissolved in 50 cc. of absolute ethanol. To the resulting alcoholic solution there was added 0.1 mole (11.3 g. of ethyl cyanoacetate and 1 cc. of glacial acetic acid). The resulting solution was cooled to 10° C. and 0.5 g. of piperidine was added in small portions. When the addition of piperidine was complete, 1 g. of 5% palladium on charcoal was introduced, and the mixture was hydrogenated at an initial pressure of 40 pounds of hydrogen. After three hours the reduction was substantially complete and the catalyst was removed by filtration. The resulting filtrate was concentrated in vacuo. The condensation-reduction product, namely ethyl-alpha-cyano-epsilon, epsilon-dicarbethoxy-dodecanoate was obtained as a very viscous oil.

Example 4

11.5 g. of ethyl hexadecylmalonate were dissolved in 50 cc. of absolute ethanol. A solution of sodium ethoxide (0.04 g. of sodium in 10 cc. of absolute ethanol) was added. The resulting reaction mixture was cooled to 5° C. Acrolein (1.7 g.) was added dropwise. The temperature of the reaction increased to 9° C. After stirring at 5° C. for a period of three hours, the reaction mixture was neutralized by the addition of the requisite quantity of glacial acetic acid. The ethanol was removed by concentration in vacuo and the gamma,gamma-dicarbethoxy-gamma-hexadecylbutyraldehyde was obtained as a viscous oil. A portion of this oil was mixed with 2,4-dinitrophenylhydrazine in a conventional manner and the resulting hydrazone was obtained as a viscous oil which solidified on standing. Recrystallization from ethanol yielded the 2,4-dinitrophenylhydrazone melting at 60-63° C.

0.1 mole of the crude gamma,gamma-dicarbethoxy - gamma - hexadecylbutyraldehyde was dissolved in 50 cc. of absolute ethanol. To the resulting alcoholic solution there was added 11.3 g. (0.1 mole) of ethyl cyanoacetate and 1 cc. glacial acetic acid. The resulting solution was cooled to 5° C. and 0.4 g. of piperidine was added in portions. When the addition of piperidine was complete, 1 g. of 5% palladium on charcoal was added and the mixture was hydrogenated at an initial pressure of 33.8 pounds. After approximately two hours, the reduction was complete and the catalyst was removed by filtration and the filtrate was concentrated in vacuo. The resulting condensation-reduction product was obtained as a very viscous oil.

It is apparent that numerous variations are possible within the scope of the invention. Thus it has been shown that the alkyl substituent on the malonic ester may be varied from two to sixteen carbon atoms in the specific examples set forth. It is also possible to use higher alkyl substituents up to the $C_{20}$ substituents and higher. Since, however, one of the most practical ways of forming the substituted malonic esters (Floyd and Miller, J. A. C. S., vol. 69, p. 2354 (1947)) involves the reaction of a low aliphatic ester of a fatty acid with an oxalate ester, the resultant alkyl substituent is two carbon atoms shorter than the fatty acid from which it is derived, and accordingly it is preferred not to employ alkyl substituents having more than sixteen carbon atoms in view of the scarcity of fatty acids from which such malonic esters may be derived. It will be apparent, however, that if higher alkyl substituents are desired, they can be obtained from the less readily available fatty acids having suitable chain lengths. There are, of course, other methods of preparing the alkyl-substituted malonic esters, and if desired, these may be employed.

Numerous variations are likewise possible in the conditions for the condensation reduction. Thus any conventional hydrogenation catalyst such as platinum, palladium, Raney nickel, and the like, may be used. Hydrogen pressures are capable of considerable variation, but, in general, pressures between one and five atmospheres are suitable. Likewise temperature conditions may be varied, and, in general, a temperature range of from 20–50° C. is desirable. The time periods likewise vary depending upon the compounds being treated, the catalyst employed, the solvent used, and the like. In general, it will be found that a time period of two to forty hours is suitable. In general the hydrogenation proceeds more readily in the presence of ethanol as the solvent than it does in the presence of dioxane. Likewise the time period is shorter where the substituent on the malonic group is a low alkyl group than it is when this substituent is a long chain aliphatic group. Variations are likewise possible in the alkyl groups used as the esterifying groups for the malonic acid and also for the cyanoacetic acid. In general, however, it is preferred that these alkyl groups contain from one to four carbon atoms. It will be apparent that other variations in the process are also possible without departing from the spirit of the invention.

The present application is a continuation-in-part of our copending application, Serial No. 755,708, filed June 17, 1947, entitled Synthesis of cyanotricarboxylate compounds, now Patent No. 2,468,352.

We claim as our invention:

1. Cyanotricarboxylate compounds having the formula:

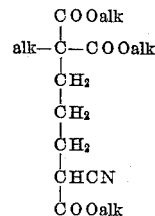

where alk represents an alkyl group containing from 6 to 20 carbon atoms.

2. Cyanotricarboxylate compounds having the formula

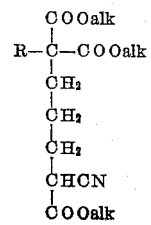

in which alk represents an alkyl group, and R is an aliphatic hydrocarbon group containing from two to twenty carbon atoms.

3. Cyanotricarboxylate compound having the formula

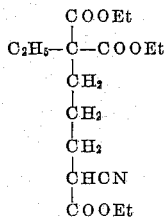

4. Cyanotricarboxylate compound having the formula

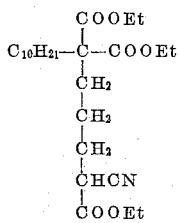

5. Cyanotricarboxylate compound having the formula

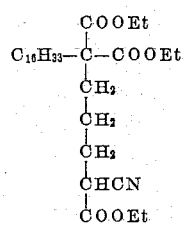

DONALD T. WARNER.
OWEN A. MOE.

REFERENCES CITED

The following references are of record in the file of this patent:

UNITED STATES PATENTS

| Number | Name | Date |
|---|---|---|
| 2,150,154 | Cope | Mar. 14, 1939 |
| 2,176,018 | Cope | Oct. 10, 1939 |

OTHER REFERENCES

Zelinsky et al., Ber. Deut. Chem., vol. 29, p. 730 (1896).

Zelinsky et al., Beilstein (Handbuch, 4th ed.), vol. II, p. 869 (1920).